Oct. 17, 1933.  S. D. HILLAS ET AL  1,930,647
HARVESTING MACHINE
Filed Oct. 15, 1932  3 Sheets-Sheet 1

INVENTORS:
Samuel David Hillas
& John William Kidd,
By their Attorneys,
Fraser, Myers & Manley Oct. 17, 1933.     S. D. HILLAS ET AL     1,930,647
HARVESTING MACHINE
Filed Oct. 15, 1932     3 Sheets-Sheet 2

INVENTORS:
Samuel David Hillas
& John William Kidd,
By their Attorneys,

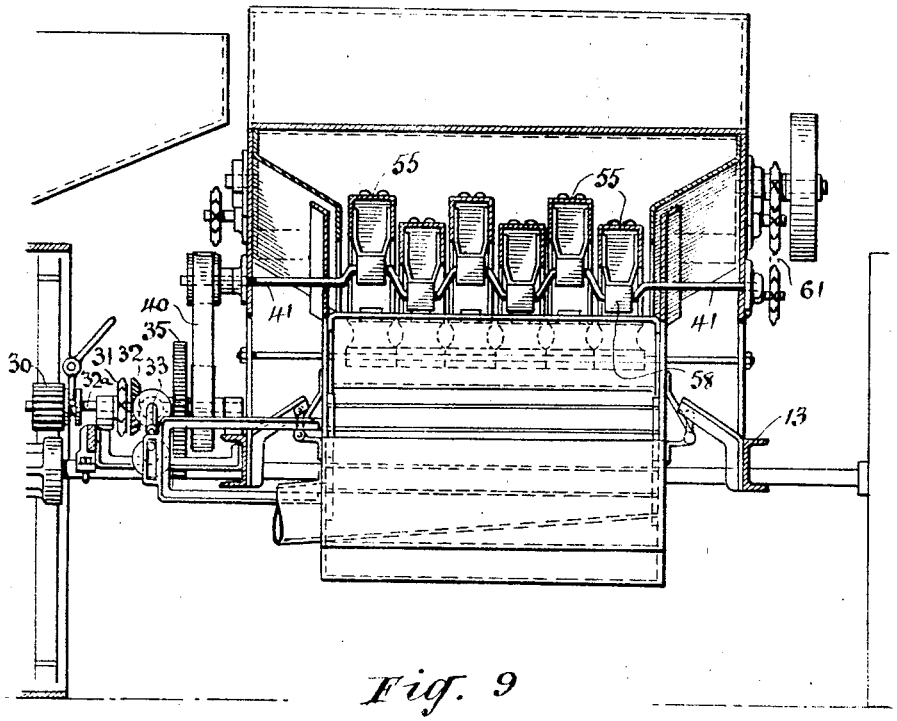
Fig. 9
Fig. 10
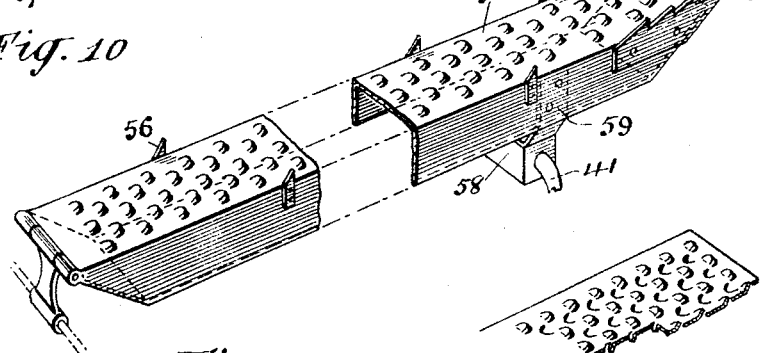
Fig. 11
Fig. 12
INVENTORS:
Samuel David Hillas
& John William Kidd,
By their Attorneys.

Patented Oct. 17, 1933

1,930,647

UNITED STATES PATENT OFFICE 1,930,647

HARVESTING MACHINE

Samuel David Hillas, Melbourne, Victoria, and John William Kidd, Moonee Ponds, Victoria, Australia Application October 15, 1932, Serial No. 637,892, and in Australia August 11, 1932

10 Claims. (Cl. 56—20)

This invention relates to harvesting machines in which the crop is garnered on a comb and cutter and conveyed into the machine to be threshed, cleaned and bagged.

One of the objects of this invention is to ensure that the comb shall remain substantially horizontal irrespective of its position in relation to the crop. Means are provided for raising and lowering the comb in the machine according to the height of the crop and the point at which it is to cut the crop without altering the substantially horizontal position of the comb which is associated with the usual reciprocating knife or cutter that is driven by special means hereinafter described.

Another object of the invention is to mount the comb on a member or unit supported in the machine front and comprising crop conveying means and an elevator. These parts with the comb and cutter are adapted as a whole to slide in guides on the machine which are set at an angle from the vertical and incline backwardly in the machine and to provide for the garnering of crops of varying dimensions while the comb is maintained in positions that are substantially horizontal.

A further object is to provide for the suspension and adjustment of the supported members, to receive and convey the cut crop and to elevate same to threshing rollers rotating at different rates of speed. From the rollers the material is passed out of the machine by specially constructed straw walkers and the grain falls to riddles where same is subjected to strong air currents that remove the chaff and dirt after which the clean grain can be conducted to the grain box and baggers in the usual way.

To relieve the dead weight of said parts on the lifting means the suspended members are connected to a stout spring vertically mounted on the machine frame. This spring is preferably quarter elliptic in form and turns over the elevator aforesaid to which its tip is connected through a turnbuckle by means of which the tension of the spring can be varied.

Still another object of the invention is the construction of the straw walkers in a stout and lasting manner, for which purpose each member is composed of an inverted U-shaped plate on the upper surface of which the feeding discs are stamped out and raised to extend in the direction of movement of said members.

The invention also provides driving means for the reciprocatory parts such as the cutting knife and the straw walkers. This drive is actuated from the prime mover such as one of the main carrying wheels through gearing and a connecting rod that is telescopic and adjustable as to length in a selfacting way. The rod is connected to a spindle on which is a disc to which a vertical rod is eccentrically connected the lower end of which is attached say, to the knife bar. The rod is further slotted to receive the spindle on which is a loose revolvable bush that is kept in the slot and means are on the disc whereby the stroke of the knife bar can be varied.

The adjustment of the machine front is preferably effected through the mechanisms hereinafter described but it will be possible to raise or lower the parts through a hand lever operated by the driver and assisted by the tension spring before mentioned.

The comb, while being maintained in a horizontal position irrespective of the height of the crop will incline slightly backwards and it will be evident that the machine and parts may be used in a harvester of the stripper type, that is to say, wherein the crop is severed by the comb unassociated with a cutting knife.

But in order to fully understand the said invention and the operation of its several parts, reference is made to the accompanying drawings, in which—

Fig. 9 illustrates the machine in rear sectional elevation on the line 9—9 of Fig. 2, with special reference to the straw walkers and the mounting and lateral reciprocation of the riddle box.

Fig. 10 is a detail view of a straw walker crank bearing to maintain the members in their relative positions longitudinally.

Fig. 11 shows in perspective view one of the integral straw walkers and

Fig. 12 is a like view of part of the top of a riddle plate.

Figure 1:
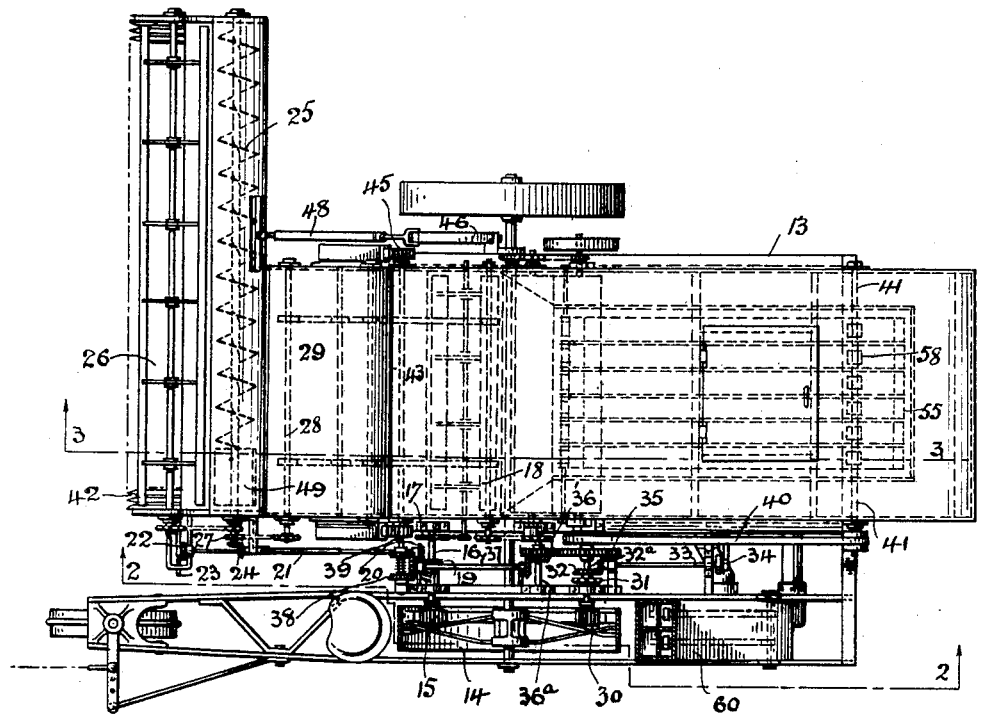
Fig. 1 shows the machine in plan view.
Figure 2:
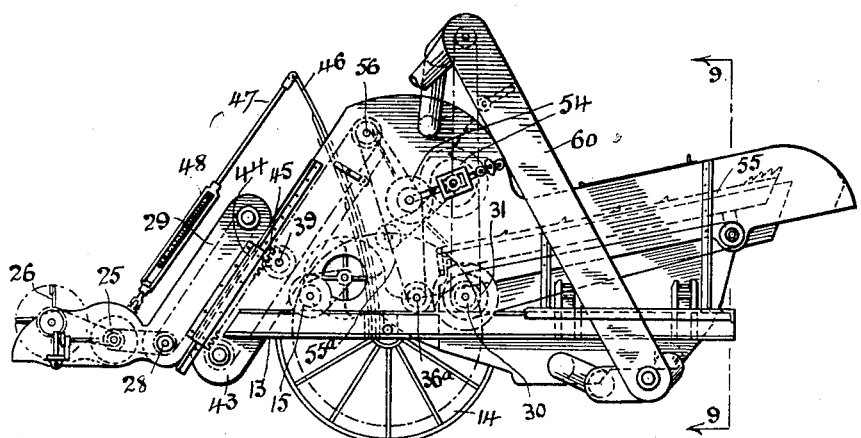
Fig. 2 is a part sectional side elevation of same on the line 2—2 of Fig. 1.

The machine is carried on a stout framework 13 and transport wheels. The prime mover of the various mechanisms is the wheel 14 having an internal toothed wheel with which a pinion 15 meshes. The spindle 16 of this pinion carries the sprocket wheel 17 that drives a smaller sprocket on the spindle of the fan 18. The spindle 16 also carries a bevel pinion 19 that meshes with a like wheel 20 on the telescopic universally jointed spindle 21 on the end of which is a disc 22 through which the knife bar 23 is reciprocated and to which further reference will be made. Also on the spindle 21 is a mitre wheel 24 through which the feed screw 25 and the feeding arms 26 are driven while from a sprocket 27 on the same spindle the actuating spindle 28 of the primary elevator 29 is driven.

A second pinion 30 in mesh with the internal toothed wheel on the main traction wheel 14 has on its spindle a sprocket wheel 31 through which the grain elevator 60 is driven. A bevel wheel 32 on a spindle 32a drives the spindle 33 through a pinion to actuate the riddle reciprocating gear 34 and on the spindle 32a is a spur wheel 35 in mesh with a like wheel 36 on which is a mitre wheel on a spindle 36a the wheel meshing with the like on a spindle 37 on the end of which is a clutch controlled mitre gearing 38 on the spindle 39 of the lifting gear of the primary elevator 29. Beyond the spur wheel 35 and on its spindle is a pulley which supports the belt 40 that drives the cranked spindle 41 and the straw walkers.

The drive for the threshing rollers 54 comes through the counter spindle 36a on which is a sprocket wheel and chain 55a that passes over a sprocket wheel on one of the rollers 54 and on to a sprocket on a spindle 56 driving at the same time the main elevator 43. The other roller 54 is driven differentially by the chain drive 61.

The suspended and adjustable members comprise the comb 42 and cutter bar 23, the feeder 26, the feed screw 25 and the primary elevator 29. These are supported so as to be adapted to slide upon the main elevator 43. On the elevator 29 is a rack 44 in which a pinion 45 on the spindle 39 engages. The spindle is rotated to raise or lower the said members upon the inclining casing of the main elevator 43. Attached rigidly in the machine is a leaf spring 46, that shown being quarter elliptic in shape. Attached to the tip of the spring is a rod 47 on which is a turnbuckle 48 that screws on the rod which at its lower end is linked to the housing on the said suspended members. The function of the spring is to maintain within reasonable limits the said suspended members in equilibrium. When the said members are lowered in the machine the spring will be tensioned, but its tension may be relieved or increased by manipulating the turnbuckle 48.

Figure 4:
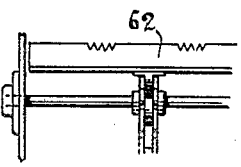
Fig. 4 is a detail view of an elevator L iron batten.
Figure 3:
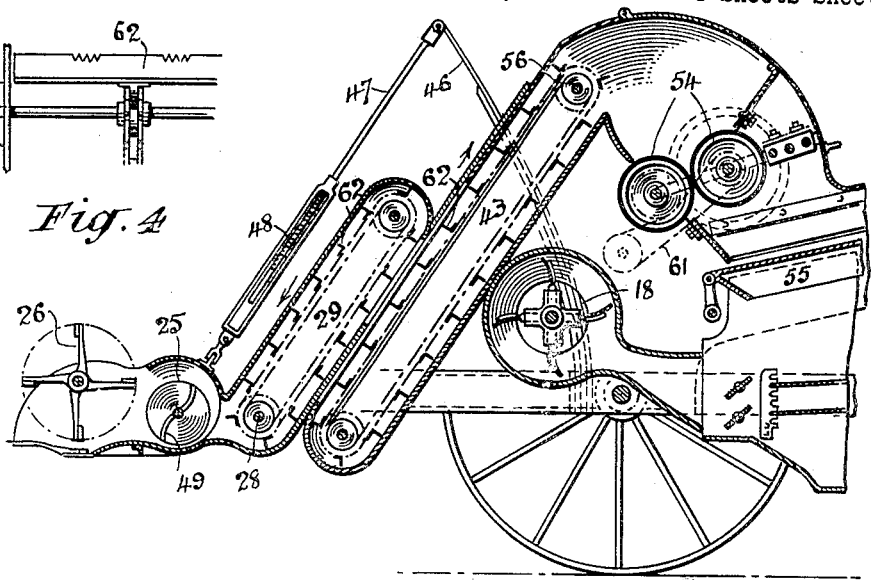
Fig. 3 illustrates part of the machine in side sectional elevation on line 3—3 of Fig. 1.
Figure 5:
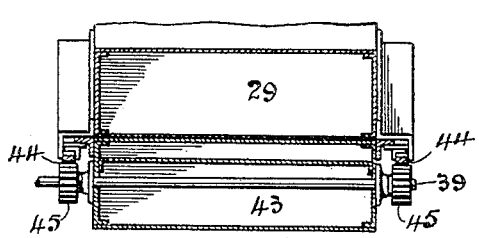
Fig. 5 shows in sectional plan the primary or adjustable elevator and the main elevator on which same moves.
Figure 6:
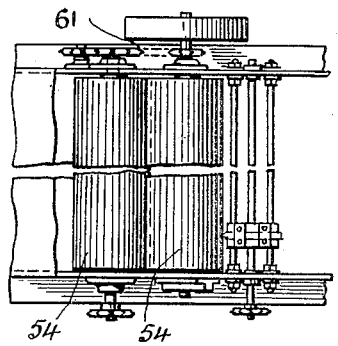
Fig. 6 shows in plan view the threshing rollers.

The primary elevator is made up of endless chains connected by transverse battens 62 that are L-shaped and moves in the direction of the arrow (Fig. 3) while the main elevator 43 is longer than and overlaps the primary and moves in the opposite direction as indicated by the arrow. The main elevator is similarly fitted with transverse L irons which will present pockets to catch loose grain on the upward movement of the elevator. A part of the elevator casing is removed to permit of the cut crop being discharged from the primary to the main elevator. To assist in raising the straw and ears each or every alternate batten may have its edge serrated, as indicated in Fig. 4.

The crop having been engaged by the comb and severed by the cutter is received by the slowly revolving feeding arms 26 and is fed by the arms into the feed screw 25 that extends across the front of the machine and by the screw is delivered to the primary elevator 29. To prevent banking of the material fed by the screw at the side of the machine the convolutions cease towards the inner end thereof and are replaced by the impeller plates 49 (Figs. 1 and 3) which pick up and convey the material at that point direct to the elevator.

Thus, the crop is cut and delivered into the machine for threshing and the delivery means housed, supported and adjusted thereon in such a way as to be operable in crops of varying dimensions while maintaining the comb substantially horizontal.

Figure 7:
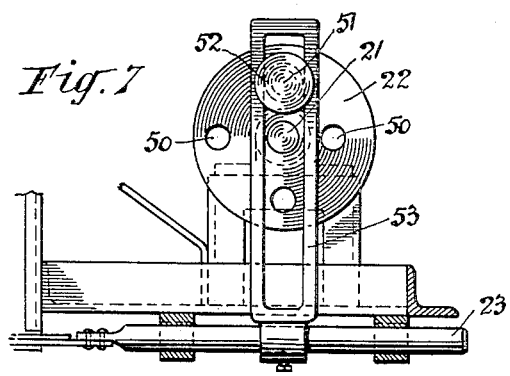
Fig. 7 is a detail view in front elevation of the knife bar reciprocating means.
Figure 8:
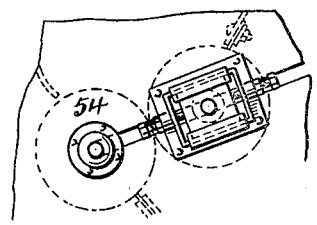
Fig. 8 is a like view of the means for adjusting the position of one of the threshing rollers.

Referring now to the drive of the cutter bar 23, the spindle 21 carries the disc 22 (Fig. 7), in which holes 50 are provided each having a different radius. On the disc and secured in one of the holes 50 is a pin 51 and on the pin is a loose bushing represented by 52. On the bar 23 of the knife or cutter a stout slotted plate 53 is attached that extends upwardly over the disc 22 to comprise in its slot the pin and bushing 52. As the spindle and disc rotate the plate 53 will be moved from side to side and the cutter bar reciprocated. The stroke of the latter will vary as the selection of a hole 50 for the reception of the pin 51. A like device is suggested for driving the riddles from 34 (Fig. 1).

The crop having been lifted to the main elevator 43 by the primary elevator is discharged over the threshing rollers 54 which are rotating at different rates of speed and which separate the grain from the ear same falling on to the straw walkers 55. These are specially constructed from a single plate bent into an inverted U shape and punched out on the upper side to provide forwardly directed raised discs. There may be attached to each walker at intervals the toothed members 56 to assist in expelling the straw. Each straw walker is mounted on the pin of a crank shaft 41 which is provided with a bulb 57 that seats in a block 58 bolted to a strap 59 over which the inverted U-shaped plate is placed and secured. By this arrangement the straw walkers are rendered less subject to warping and wear and tear and in operation are maintained in their relative positions longitudinally in the machine. From the straw walkers the grain falls on to the riddles which are of the usual construction and over which a draft of air is passed from the fan 18. After being riddled and cleaned the grain will pass to an elevator and the grain box or baggers as the case may be.

Having now described our invention what we claim as new and desire to secure by Letters Patent is:—

1. In a harvesting machine, a comb on which the crop is garnered, slowly moving feeding arms behind the comb, a primary elevator, a feeding screw between the feeding arms and the elevator the whole being supported on the machine body and adapted to sliding movement thereon, a main elevator behind and overlapping the primary and threshing means near the top of the main elevator.

2. In a harvesting machine, a comb, feeding arms behind the comb, a primary elevator and a feeding screw between the feeding arms and the elevator, a main elevator behind and overlapping the primary elevator and receiving the cut crop therefrom, threshing means near the top of the main elevator and straw walkers and riddles below the threshing means, the comb, feeders and primary elevator being adapted to slide upon the casing of the main elevator.

3. In a harvesting machine, a comb, a primary elevator, crop feeding means between the comb and elevator, a main elevator overlapping the primary, an opening in its casing over which the primary elevator is adapted to slide, racks on the primary elevator, pinions supported in the main elevator, means for operating the pinions and L-shaped battens in each elevator.

4. In a harvesting machine, a comb, a primary elevator and crop feeding means between the comb and elevator supported on the machine and adapted to slide thereon, a cutter below the comb, a universally jointed spindle, a disc on the forward end thereof, a cutter bar, a vertically slotted plate on the bar, a pin on the disc in the slotted plate and means for rotating the telescopic spindle.

5. In a harvesting machine, a comb, a primary elevator and crop feeding means between the comb and elevator supported on the machine and adapted to slide thereon, a cutter below the comb, a universally jointed spindle, a disc on the forward end thereof, holes in the disc at varying radii, a cutter bar, a vertically slotted plate on the bar, a pin on the disc in the slotted plate, a loose bush about the pin and means for rotating the telescopic spindle.

6. In a harvesting machine, a comb, a primary elevator and crop feeding means between the comb and elevator supported on the machine and adapted to slide thereon, a main elevator, threshing means near the top of said main elevator and straw walkers below the threshing means constructed of a single plate of metal bent into inverted U shape and upwardly inclined discs punched out of the plate.

7. In a harvesting machine, a comb, a primary elevator and crop feeding means between the comb and elevator supported on the machine and adapted to slide thereon, a main elevator, threshing means near the elevator, straw walkers below the threshing means, a multi throw crank shaft on which the straw walkers are mounted, a bulb in the waist of each crank pin, a recessed block on the bulb of each crank pin and a plate on the block over which the straw walker is placed and secured.

8. In a harvesting machine, a comb, a primary elevator, crop feeding means between the comb and elevator constituting a unit supported upon the machine, a main elevator behind the primary and over which the unit is adapted to slide, threshing means near the top of the main elevator and a spring secured at its one end in the machine, a rod attached to its tip and the supported unit and a turnbuckle in the rod.

9. In a harvesting machine, a comb, an elevator to the rear of and of less lateral dimensions than the comb, a rotary feeding device of an effectual length substantially equal to that of the comb for moving the crop collected by the comb rearwardly towards the elevator, a feed screw to move parts of the crop collected by a laterally extended part of the comb towards the crop-receiving portion of the elevator, and means at one end of the feed screw to cooperate with the adjacent part of the rotary feeding device for feeding a portion of the crop directly from the adjacent part of the comb to the elevator.

10. In a harvesting machine, the combination with a threshing mechanism and its carriage, of a comb on which a crop may be garnered, an elevator, a feeding mechanism to transfer the crop from the comb to the elevator, the comb, feeding mechanism and elevator being united to form a unitary structure, a sliding connection between said structure and the carriage whereby it may be elevated and depressed without relative rotation, and means for delivering the crop to the threshing mechanism from the relatively movable unitary structure.

SAMUEL DAVID HILLAS.
JOHN WILLIAM KIDD.